(12) United States Patent
Hayashi et al.

(10) Patent No.: US 11,580,146 B2
(45) Date of Patent: Feb. 14, 2023

(54) INFERENCE SYSTEM

(71) Applicant: NEC Corporation, Tokyo (JP)

(72) Inventors: Yuki Hayashi, Tokyo (JP); Jun Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 665 days.

(21) Appl. No.: 16/609,506

(22) PCT Filed: Apr. 26, 2018

(86) PCT No.: PCT/JP2018/017092
§ 371 (c)(1),
(2) Date: Oct. 30, 2019

(87) PCT Pub. No.: WO2018/207649
PCT Pub. Date: Nov. 15, 2018

(65) Prior Publication Data
US 2020/0143268 A1    May 7, 2020

(30) Foreign Application Priority Data

May 11, 2017  (JP) .............................. JP2017-094948

(51) Int. Cl.
*G06F 16/33* (2019.01)
(52) U.S. Cl.
CPC ................................ *G06F 16/3331* (2019.01)
(58) Field of Classification Search
CPC .................................................. G06F 16/3331
See application file for complete search history.

(56) References Cited

U.S. PATENT DOCUMENTS

2011/0184941 A1* 7/2011 El-Charif .......... G06F 16/24578
707/723
2012/0117082 A1* 5/2012 Koperda ........... G06F 16/24578
707/E17.084
(Continued)

FOREIGN PATENT DOCUMENTS

JP    H2-244331 A    9/1990
JP    H5-204650 A    8/1993
(Continued)

OTHER PUBLICATIONS

Shin et al., "Incremental Knowledge Base Construction Using DeepDive", Proceedings of the VLDB Endowment, vol. 8, No. 11, pp. 1310-1321, 2015, 12 pages total.
(Continued)

*Primary Examiner* — James Trujillo
*Assistant Examiner* — Michal Bogacki
(74) *Attorney, Agent, or Firm* — Sughrue Mion, PLLC

(57) ABSTRACT

A rule storing unit stores a set of rules each defining facts and a relation between the facts, and weights representing importance levels of the rules. An input data storing unit stores input data. A query storing unit stores a query. An importance level calculating unit calculates an importance level of each fact type of the facts defined by the rules. A fact data generating unit generates, for each fact type, fact data in which true/false is observed as a fact by a number corresponding to the importance level of the fact type, from the input data. A fact data storing unit stores the fact data. An inference performing unit performs probabilistic inference of a result of the query by using the fact data, the rules, and the weights. An output unit outputs a result of the inference.

15 Claims, 18 Drawing Sheets

(56) References Cited

U.S. PATENT DOCUMENTS

| | | | | |
|---|---|---|---|---|
| 2012/0278321 A1* | 11/2012 | Traub | ............... | G06F 16/3331 |
| | | | | 707/E17.014 |
| 2013/0339526 A1* | 12/2013 | Ruellan | ............... | H04L 67/568 |
| | | | | 709/226 |
| 2014/0136542 A1* | 5/2014 | Cooper | ............... | G06F 16/285 |
| | | | | 707/740 |
| 2015/0058349 A1* | 2/2015 | Ramnani | ............... | G06F 16/35 |
| | | | | 707/740 |
| 2017/0300573 A1* | 10/2017 | He | ............... | G06F 16/951 |
| 2017/0308986 A1* | 10/2017 | Simpson | ............... | G06F 40/30 |

FOREIGN PATENT DOCUMENTS

| | | |
|---|---|---|
| JP | 2005-107743 A | 4/2005 |
| JP | 2013-8221 A | 1/2013 |

OTHER PUBLICATIONS

International Search Report dated Jul. 17, 2018 in International Application No. PCT/JP2018/017092.

Written Opinion dated Jul. 17, 2018 in International Application No. PCT/JP2018/017092.

* cited by examiner

FIG. 2

INFERENCE RULE 1 w=5 :

Smoke(x) ⇒ Cancer(x)

INFERENCE RULE 2 w=1 :

Friend(x,y) ⇒ (Smoke(x) ⇔ Smoke(y))

FIG. 3

| Smoke | |
|---|---|
| VARIABLE | TRUE/FALSE |
| Smoke(A) | 1 |
| Smoke(C) | 0 |
| Smoke(D) | 0 |
| ⋮ | ⋮ |

| Cancer | |
|---|---|
| VARIABLE | TRUE/FALSE |
| Cancer(C) | 0 |
| Cancer(E) | 1 |
| Cancer(F) | 0 |
| ⋮ | ⋮ |

| Friend | |
|---|---|
| VARIABLE | TRUE/FALSE |
| Friend(A,A) | 0 |
| Friend(A,B) | 1 |
| Friend(A,D) | 0 |
| ⋮ | ⋮ |

FIG. 4

| Cancer |
|---|
| VARIABLE |
| Cancer(A) |
| Cancer(B) |
| Cancer(C) |
| ⋮ |

FIG. 5

```
FACT DATA TOTALITY
  120
```

```
PRIMITIVE EXPRESSION IMPORTANCE LEVEL
  Smoke(x) = 6
  Cancer(x) = 5
  Friend(x,y) = 1
```

FIG. 6

| Smoke | |
|---|---|
| VARIABLE | TRUE/FALSE |
| Smoke(A) | 1 |
| Smoke(C) | 0 |
| ⋮ | ⋮ |

| Cancer | |
|---|---|
| VARIABLE | TRUE/FALSE |
| Cancer(C) | 0 |
| Cancer(F) | 0 |
| ⋮ | ⋮ |

| Friend | |
|---|---|
| VARIABLE | TRUE/FALSE |
| Friend(A,B) | 1 |
| Friend(A,D) | 0 |
| ⋮ | ⋮ |

FIG. 7

| Cancer ||
|---|---|
| VARIABLE | PROBABILITY |
| Cancer(A) | 80% |
| Cancer(B) | 80% |
| Cancer(C) | 0% |
| ⋮ | ⋮ |

```
INFERENCE RULE 1
  w=5 :
  Smoke(x) ⇒ Cancer(x)

INFERENCE RULE 2
  w=1 :
  Friend(x,y) ⇒ (Smoke(x) ⇔ Smoke(y))
```

```
PRIMITIVE EXPRESSION : Smoke(x), Cancer(x), Friend(x,y)
```

```
INFERENCE RULE 1
  w=5 :
  Smoke(x) ⇒ Cancer(x)

INFERENCE RULE 2
  w=1 :
  Friend(x,y) ⇒ (Smoke(x) ⇔ Smoke(y))
```

CALCULATE USING WEIGHT GIVEN TO INFERENCE RULE

```
Smoke(x) : Cancer(x) : Friend(x,y)
=5+1 : 5 : 1
```

INFERENCE RULE 1
w=5 :
Smoke(x) ⇒ Cancer(x)

INFERENCE RULE 2
w=1 :
Friend(x,y) ⇒ (Smoke(x) ⇔ Smoke(y))

ASSUMING TWO PERSONS A AND B, EXPRESS CONNECTION RELATION OF INFERENCE RULES WITH NETWORK.

CALCULATE USING HOP COUNT UP TO PRIMITIVE EXPRESSION THAT BECOMES QUERY

Smoke(x) : Cancer(x) : Friend(x,y)
=1/2 : 1/1 : 1/3

FIG. 15

```
· · ·
· · · MR. A IS KNOWN AS SMOKER · · ·
· · ·
· · · · MR. A OFTEN · · · WITH HIS FRIEND B · · ·
· · · ·
```

INFERENCE SYSTEM

This application is a National Stage Entry of PCT/JP2018/017092 filed on Apr. 26, 2018, which claims priority from Japanese Patent Application 2017-094948 filed on May 11, 2017, the contents of all of which are incorporated herein by reference, in their entirety.

TECHNICAL FIELD

The present invention relates to an inference system, an inference method, and a computer-readable recording medium.

BACKGROUND ART

An inference system is an information processing system that uses facts and rules describing the relations between the facts to derive facts that are not explicitly shown as knowledge. The following techniques have been proposed as techniques relating to such an inference system.

For example, Patent Document 1 describes an inference system that uses a set of weighted rules and observed fact data to calculate the probability of a fact that is not explicitly shown as knowledge.

Further, Non-Patent Document 1 describes a feature extractor that uses open source software called DeepDive to extract structured fact data that can be used in an inference system from unstructured data such as text. Non-Patent Document 1 also describes an inference system that uses the fact data extracted by the feature extractor and a set of weighted rules to calculate the probability of a fact that is not explicitly shown as knowledge.

Further, Patent Document 2 describes a fuzzy inference device that performs an inference operation for each inference rule on an input and generates a definitive value output from each inference output. The fuzzy inference device includes a means for performing an inference operation for each inference rule, a means for setting, for each inference rule, an absolute weight coefficient specific to each rule and a relative weight value between rules, and a means for correcting an inference output by the absolute and relative weight coefficients.

Further, Patent Document 3 describes that in active learning, learning data is randomly resampled to generate partial data. Learning data is data in which its label (class or function value) is set, and corresponds to fact data.
Patent Document 1: Japanese Unexamined Patent Application Publication No. JP-A 2013-008221
Patent Document 2: Japanese Unexamined Patent Application Publication No. JP-A H2-244331 (1990)
Patent Document 3: Japanese Unexamined Patent Application Publication No. JP-A 2005-107743
Non-Patent Document 1: Jaeho Shin, Sen Wu, Feiran Wang, Christopher De Sa, Ce Zhang, and Christopher Re, "Incremental Knowledge Base Construction Using DeepDive" Proceedings of the VLDB Endowment (PVLDB), 2015

In general, in an inference system, when fact data becomes large, the amount of calculation for inference increases, and a time for calculation required for inference tends to increase exponentially.

Then, in order to shorten a time for calculation required for inference, the amount of fact data used for inference may be reduced as described in Patent Document 3. However, when the amount of fact data used for inference is randomly reduced, the accuracy of inference largely decreases.

SUMMARY

An object of the present invention is to provide an inference system that solves the abovementioned problem, that is, the problem that when the amount of fact data used for inference is randomly reduced in order to reduce the amount of calculation, the accuracy of inference largely decreases.

An inference system according to an aspect of the present invention includes: a rule storing unit configured to store a set of rules each defining facts and a relation between the facts, and store weights representing importance levels of the rules; an input data storing unit configured to store input data; a query storing unit configured to store a query; an importance level calculating unit configured to calculate an importance level of each fact type of the facts defined by the rules; a fact data generating unit configured to generate, for each fact type, fact data in which true/false is observed as a fact by a number corresponding to the importance level of the fact type, from the input data; a fact data storing unit configured to store the fact data; an inference performing unit configured to perform probabilistic inference of a result of the query by using the fact data, the rules, and the weights; and an output unit configured to output a result of the inference.

An inference method according to another aspect of the present invention is an inference method performed by an information processing device that has a storing unit configured to store a set of rules each defining facts and a relation between the facts, weights representing importance levels of the rules, input data, and a query, and has a processor connected to the storing unit. The inference method includes: by the processor, calculating an importance level of each fact type of the facts defined by the rules; by the processor, generating, for each fact type, fact data in which true/false is observed as a fact by a number corresponding to the importance level of the fact type, from the input data; by the processor, performing probabilistic inference of a result of the query by using the fact data, the rules, and the weights; and by the processor, outputting a result of the inference.

Further, a non-transitory computer-readable recording medium according to another aspect of the present invention stores a program for causing a processor, which is connected to a storing unit configured to store a set of rules each defining facts and a relation between the facts, weights representing importance levels of the rules, input data, and a query, to function as: an importance level calculating unit configured to calculate an importance level of each fact type of the facts defined by the rules; a fact data generating unit configured to generate, for each fact type, fact data in which true/false is observed as a fact by a number corresponding to the importance level of the fact type, from the input data; an inference performing unit configured to perform probabilistic inference of a result of the query by using the fact data, the rules, and the weights; and an output unit configured to output a result of the inference.

With the configurations described above, the present invention can prevent the accuracy of inference from largely decreasing even if the amount of fact data is reduced in order to reduce the amount of calculation.

BRIEF DESCRIPTION OF DRAWINGS

FIG. 2 is a diagram showing an example of a rule (an inference rule) used in the inference system according to the first example embodiment of the present invention;

FIG. 3 is a diagram showing an example of input data used in the inference system according to the first example embodiment of the present invention;

FIG. 4 is a diagram showing an example of a query used in the inference system according to the first example embodiment of the present invention;

FIG. 5 is a diagram showing an example of the totality of fact data and the importance level of a primitive expression as fact data generation conditions used in the inference system according to the first example embodiment of the present invention;

FIG. 6 is a diagram showing an example of fact data used in the inference system according to the first example embodiment of the present invention;

FIG. 7 is a diagram showing an example of an inference result of the inference system according to the first example embodiment of the present invention;

FIG. 15 is a diagram showing an example of input data used in the inference system according to the second example embodiment of the present invention;

EXAMPLE EMBODIMENTS

Next, example embodiments of the present invention will be described in detail with reference to the drawings.

First Example Embodiment

Figure 1:
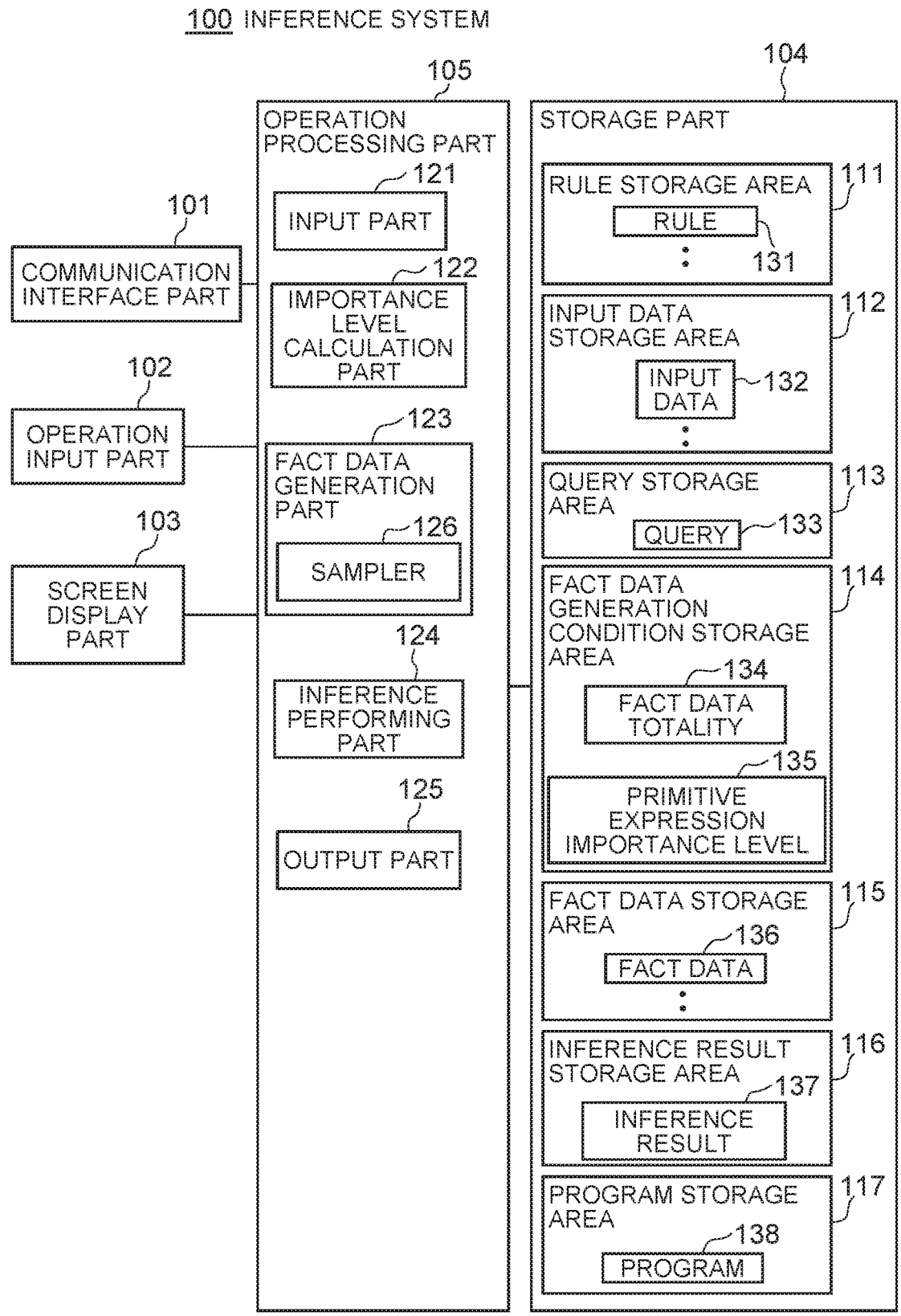
FIG. 1 a block diagram of an inference system according to a first example embodiment of the present invention.

FIG. 1 is a block diagram of an inference system 100 according to a first example embodiment of the present invention. The inference system 100 according to this example embodiment is a logical inference system that performs inference based on knowledge expressed in a logical expression. More specifically, the inference system 100 performs probabilistic inference to determine the probability of a query based on a set of weighted rules and fact data observed as a fact. The inference system 100 includes, as major hardware, a communication interface part 101, an operation input part 102, a screen display part 103, a storage part 104, and an operation processing part 105.

The communication interface part 101 is formed by a data communication circuit, and has a function of performing data communication with various external devices (not shown) through a wired or wireless communication line (not shown).

The operation input part 102 is formed by an operation input device such as a keyboard and a mouse, and has a function of detecting operation by the operator and outputting to the operation processing part 105.

The screen display part 103 is formed by a screen display device such as an LCD (Liquid Crystal Display) and a PDP (Plasma Display Panel), and has a function of displaying on a screen various information such as an operation menu and an inference result in accordance with an instruction from the operation processing part 105.

The storage part 104 is formed by a storage device such as a hard disk and a memory. The storage part 104 has a storage area for storing processing information necessary for various processing executed by the operation processing part 105 and a program. To be specific, the storage part 104 includes a rule storage area 111, an input data storage area 112, a query storage area 113, a fact data generation condition storage area 114, a fact data storage area 115, an inference result storage area 116, and a program storage area 117.

In the rule storage area 111, one or more rules 131 are stored. The rule 131 is a logical expression that defines facts and the relation between the facts. The rule 131 is also referred to as an inference rule.

FIG. 2 shows an example of the rule (inference rule) 131. In this example, the rule 131 is expressed in the form of first-order predicate logic. Although the rule described with first-order predicate logic is shown as an example herein, the rule may be a rule described with propositional logic.

A first inference rule, an inference rule 1, shown in FIG. 2 is a logical expression in which a primitive expression Smoke (x) representing a fact that a certain person x smokes and a primitive expression Cancer (x) representing a fact that the certain person x has cancer are connected by a logical connector⇒representing implication. In the primitive expression, Smoke and Cancer are called predicate symbols, and x is called a variable symbol. The inference rule 1 represents a meaning that "a smoker can easily get cancer." Moreover, w=5 added to the inference rule 1 is the weight of this rule 1. The weight of a rule represents the importance level of the rule. The more the value of the weight of a rule becomes, the higher the importance level thereof becomes.

A second inference rule, an inference rule 2, shown in FIG. 2 is a logical expression in which a primitive expression Friend (x, y) representing a fact that a certain person x and another certain person y are friends and a logical expression in which a primitive expression Smoke (x)

representing a fact that the certain person x smokes and a primitive expression Smoke (y) representing a fact that the certain person y smokes are connected by a logical connector⇔representing equivalence are further connected by a logical connector⇒representing implication. The inference rule 2 represents a meaning that "a smoker's friend is likely to smoke." Moreover, a weight w=1 is added to the rule 2.

In the input data storage area 112, one or more input data 132 are stored. In the case of this example embodiment, the input data 132 is fact data that represents a fact in which true/false as a fact has been observed in the form of first-order predicate logic.

FIG. 3 shows an example of the input data 132. The input data 132 in this example is formed by a variable-true/false pair. A variable is a primitive expression representing a fact relating to a specific individual, and true/false represents whether the fact is true or not. For example, input data in which the variable is Smoke (A) and true/false is 1 is fact data representing a fact that a specific individual A smokes is true. Input data in which the variable is Smoke (C) and true/false is 0 is fact data representing a fact that a specific individual C smokes is false. FIG. 3 shows an example in which input data are sorted by primitive expression type.

In the query storage area 113, a query 133 is stored. A query is a set of primitive expressions for which it is wanted to know the probability of being true.

Figure 4:
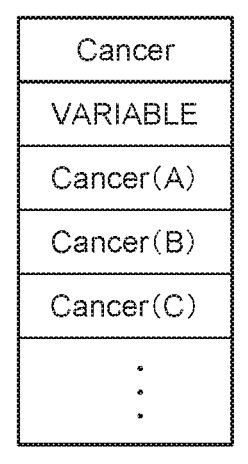

FIG. 4 shows an example of the query 133. The query 133 in this example is formed by a variable. A variable is a primitive expression representing a fact relating to a specific individual. For example, a query that the variable is Cancer (A) is a query for inquiring the probability that a specific individual A has cancer.

In the fact data generation condition storage area 114, a condition for generating fact data used for inference from the set of the input data 132 stored in the input data storage area 112 is stored. In the case of this example embodiment, in the fact data generation condition storage area 114, two conditions, a fact data totality 134 and a primitive expression importance level 135, are stored. The fact data totality 134 represents the totality of fact data used for inference. The primitive expression importance level 135 represents an importance level for each type of the primitive expressions included in the rules stored in the rule storage area 111.

FIG. 5 shows an example of the fact data totality 134 and the primitive expression importance level 135. In this example, the fact data totality 134 represents that there are 120 pieces of fact data. Moreover, in this example, the importance level of the primitive expression Smoke (x) is 6, the importance level of the primitive expression Cancer (x) is 5, and the importance level of the primitive expression Friend (x, y) is 1.

In the fact data storage area 115, fact data 136 used for inference generated from the set of the input data 132 is stored. As well as the input data 132 stored in the input data storage area 112, the fact data 136 stored in the fact data storage area 115 is formed by a variable-true/false pair as shown in FIG. 6.

In the inference result storage area 115, an inference result 137 is stored. The inference result 137 represents the probability of the query 133 stored in the query storage area 113.

FIG. 7 shows an example of the inference result 137. The inference result 137 of this example is formed by a variable-probability pair. The variable is a primitive expression representing a fact relating to a specific individual, and the probability is the probability of the query. For example, an inference result in which the variable is Cancer (A) and the probability is 80% represents that the probability of a query in which a specific individual A has cancer is 80%.

In the program storage area 117, a program 138 is stored. The program 138 is a program loaded and executed by the operation processing part 105 to realize various processing parts. The program 138 is previously loaded from an external device (not shown) via a data input/output function such as the communication interface part 101 or from a program storage medium such as a CD-ROM, and stored into the program storage area 117.

The operation processing part 105 has a microprocessor such as an MPU and a peripheral circuit thereof, and has a function of, by loading the program 138 from the storage part 104 and executing the program 138, causing the above-mentioned hardware and the program 138 to cooperate and realizing various processing parts. Major processing parts realized by the operation processing part 105 are an input part 121, an importance level calculation part 122, a fact data generation part 123, an inference performing part 124, and an output part 125.

The input part 121 has a function of inputting the rule 131, the input data 132, the query 133, and the fact data totality 134 from outside through the communication interface part 101 or the operation input part 102, and storing into the rule storage area 111, the input data storage area 112, the query storage area 113, and the fact data generation condition storage area 114 of the storage part 104.

The importance level calculation part 122 has a function of calculating an importance level for each type of the facts defined by the rules 131, that is, for each primitive expression type. To be specific, the importance level calculation part 122 has a function of retrieving all the rules 131 from the rule storage area 111 and calculating an importance level for each type of the primitive expressions defined in the rules 131. Moreover, the importance level calculation part 122 has a function of storing an importance level for each primitive expression type obtained by calculation as the primitive expression importance level 135 into the fact data generation condition storage area 114.

The fact data generation part 123 has a function of generating a set of the fact data 136 from a set of the input data 132. To be specific, the fact data generation part 123 retrieves all the input data from the input data storage area 112, and also retrieves the fact data totality 134 and the primitive expression importance level 135 from the fact data generation condition storage area 114. Next, the fact data generation part 123 determines a fact data count to be assigned to each type of the primitive expressions, of the fact data totality 134, based on the importance level 135 of the primitive expression. At this time, a larger fact data count is assigned to a primitive expression type having a higher importance level than a primitive expression type having a lower importance level. Next, the fact data generation part 123 uses a sampler 126 to, for each primitive expression type, randomly sample fact data of the fact data count assigned to the primitive expression type from a set of the input data 132 corresponding to the primitive expression type included in the input data 132. The fact data generation part 123 stores the input data 132 obtained by sampling into the fact data storage area 115 as the fact data 136.

The inference performing part 124 has a function of performing probabilistic inference to obtain the probability of the query 133 stored in the query storage area 113, based on the set of the rules 131 stored in the rule storage area 111 and the set of the fact data 136 stored in the fact data storage area 115. The inference performing part 124 stores the result of the probabilistic inference as the inference result 137 into the inference result storage area 116.

The output part 125 has a function of retrieving the inference result 137 from the inference result storage area 116 and outputting the inference result 137 to the screen display part 103. The output part 125 also has a function of retrieving the inference result 137 from the inference result storage area 116 and outputting the inference result 137 to an external device through the communication interface part 101.

Figure 8:
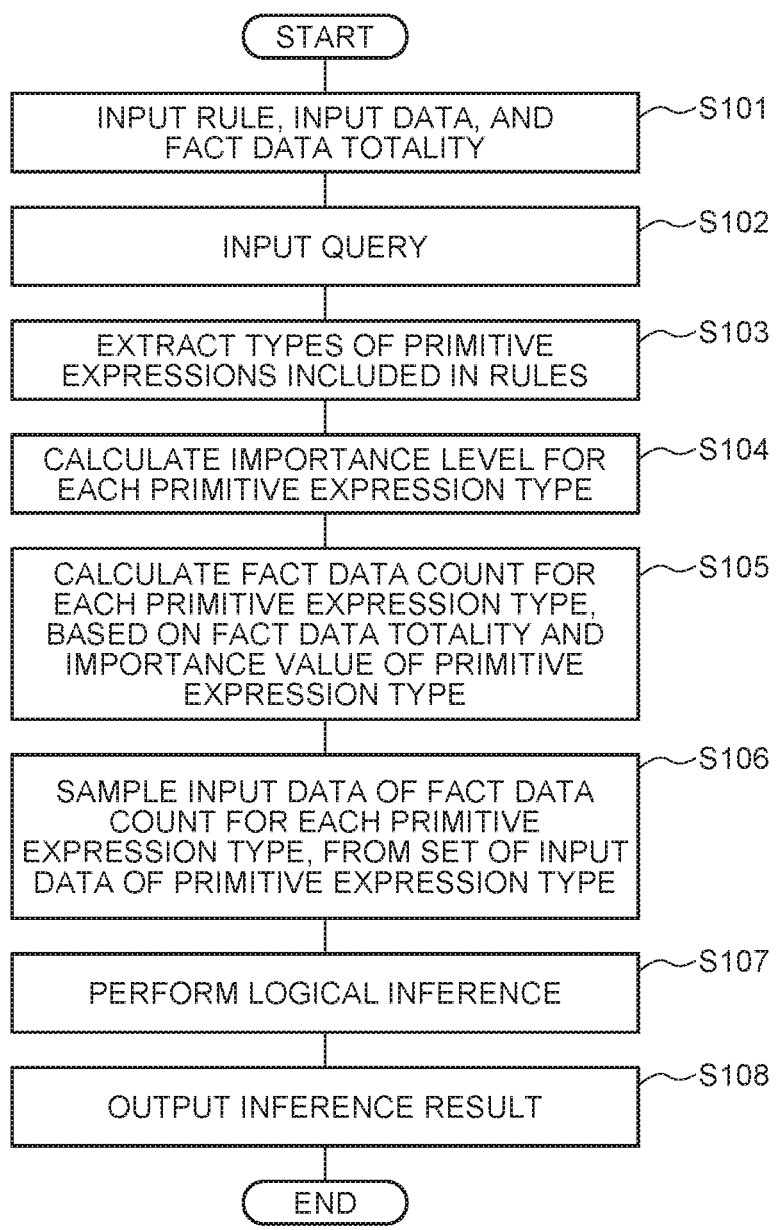
FIG. 8 is a flowchart showing an example of the operation of the inference system according to the first example embodiment of the present invention.

FIG. 8 is a flowchart showing an example of the operation of the inference system 100 according to this example embodiment. With reference to FIG. 8, the operation of the inference system 100 according to this example embodiment will be described below.

Referring to FIG. 8, first, the input part 121 inputs a set of the rules 131, a set of the input data 132, and the fact data totality 134 that is part of fact data generation conditions from outside through the operation input part 102 or the communication interface part 101, and stores them into the rule storage area 111, the input data storage area 112, and the fact data generation condition storage area 114 of the storage part 104 (step S101). However, in a case where a set of the rules 131, a set of the input data 132, and the fact data totality 134 are already stored in the rule storage area 111, the input data storage area 112, and the fact data generation condition storage area 114 of the storage part 104, step S101 may be omitted.

Next, the input part 121 inputs a set of the queries 133 from outside through the operation input part 102 or the communication interface part 101, and stores the set of the queries 133 it into the query storage area 113 of the storage part 104 (step S102). However, in a case where a set of the queries 133 is already stored in the query storage part 113 of the storage part 104, step S102 may be omitted.

Figure 9:
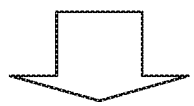
FIG. 9 is a diagram showing an example of extraction of a primitive expression from rules in the inference system according to the first example embodiment of the present invention.

Next, the importance level calculation part 122 retrieves all the rules 131 from the rule storage part 111 of the storage part 104 and analyzes them, and extracts all the types of the primitive expressions included in the rules 131 (step S103). For example, in a case where the retrieved rules 131 are the inference rule 1 and the inference rule 2 shown in FIG. 2, the importance level calculation part 122 extracts three types of primitive expressions including Smoke (x), Cancer (x) and Friend (x, y) as shown in FIG. 9. At this time, the importance level calculation part 122 recognizes that Smoke (y) included in the inference rule 2 is the same type of primitive expression as Smoke (x) included in the inference rule 1.

Next, the importance level calculation part 122 calculates the importance levels of the types of the extracted primitive expressions, and stores them into the fact data generation condition storage area 114 as the importance levels 135 of the primitive expressions (step S104).

Next, the fact data generation part 123 retrieves the fact data totality 134 and the primitive expression importance level 135 from the fact data generation condition storage area 114 of the storage part 104, and calculates a fact data count for each primitive expression type based on the fact data totality 134 and the primitive expression importance level 135 (step S105). Next, the fact data generation part 123 retrieves all the input data 132 from the input data storage area 112 of the storage part 104, samples input data of a fact data count for each primitive expression type, from a set of the input data for each primitive expression type, and stores as the fact data 136 into the fact data storage area 115 (step S106).

Next, the inference performing part 124 retrieves all the rules 131, all the fact data 136 and all the queries 133 from the rule storage area 111, the fact data storage area 115 and the query storage area 113 of the storage part 104, infers, for each of the queries 133, the probability of the query based on all the rules 131 and all the fact data 136, and stores the result of inference as the inference result 137 into the inference result storage area 116 (step S107).

Next, the output part 125 retrieves the inference result 137 from the inference result storage area 116 of the storage part 104, outputs the inference result 137 to the screen display part 103, and/or outputs the inference result 137 to an external device through the communication interface part 101 (step S108).

Next, a method in which the importance level calculation part 122 calculates the importance level of each type of primitive expressions defined in the rule 131 will be described in detail.

Method Using Weight of Rule

To begin with, a method for calculating the importance level of each primitive expression type by using the weight of the rule 131 will be described. The weight of the rule 131 represents the importance level of that rule 131. For this reason, the type of a primitive expression included in a rule having a higher importance level is considered to have a higher importance level. Therefore, the importance level calculation part 122 focuses on each of the types of the primitive expressions and executes the following processing.

First, the importance level calculation part 122 initializes the importance level of a focused primitive expression type to zero. Next, the importance level calculation part 122 focuses on each of the rules 131 and, if the focused primitive expression type is included in the focused rule 131, adds the weight of the focused rule 131 to the importance level of the focused primitive expression type. The cumulative value of the importance levels of the focused primitive expression type when all the rules 131 have been focused on becomes the final importance level of the focused primitive expression type. A specific example is shown in FIG. 10.

Figure 10:
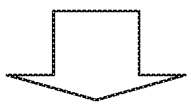
FIG. 10 is a diagram showing an example of calculation of an importance level for each primitive expression type by using the weight of a rule in the inference system according to the first example embodiment of the present invention.

In FIG. 10, focusing on Smoke (x), this primitive expression is included in the inference rule 1 and the inference rule 2. As a result, the importance level of Smoke (x) is "6" obtained by adding the weight "5" of the inference rule 1 and the weight "1" of the inference rule 2. Moreover, focusing on Cancer (x), this primitive expression is included only in the inference rule 1. As a result, the importance level of Cancer (x) is "5." Moreover, focusing on Friend (x, y), this primitive expression is included only in the inference rule 2. As a result, the importance level of Friend (x, y) is "1."

Method Using Hop Count up to Primitive Expression That Becomes Query

Next, a method for calculating the importance level for each primitive expression type by using a hop count up to a primitive expression that becomes a query will be described. In probabilistic logic inference, the probability of a query is obtained based on a set of rules and fact data observed as facts. Therefore, it is clear that a primitive expression that becomes a query is the most important. Of rules including a primitive expression other than the primitive expression that becomes the query, a rule which affects the probability of the query is a rule which connects to the primitive expression that becomes the query either directly or via one or more other rules by a logical connector such as implication or equivalence. The degree of affecting the probability of the query becomes larger as the rule is connected closer to the primitive expression that becomes the query. Therefore, the importance level calculation part 122 executes the following processing.

First, the importance level calculation part 122 generates a network in which primitive expressions associated with each other by the rules 131 are connected by a link. Next, the importance level calculation part 122 calculates a hop count, which is the minimum number of links from a primitive expression in the network to a primitive expression that becomes the query, for each primitive expression type. Then, the importance level calculation part 122 sets the calculated hop count for each primitive expression type as the importance level of the primitive expression type. A specific example is shown in FIG. 11.

Figure 11:
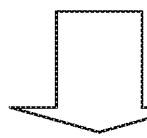
FIG. 11 is a diagram showing an example of calculation of an importance level for each primitive expression type by using a hop count up to a primitive expression that becomes a query in the inference system according to the first example embodiment of the present invention.
Figure 11:
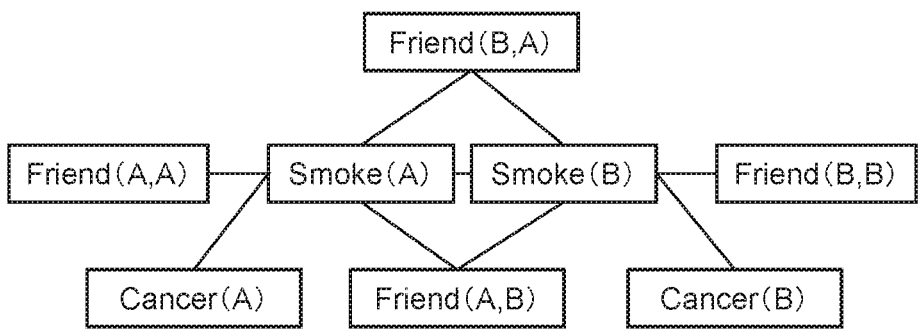
Figure 11:
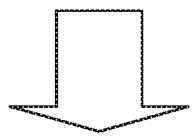

In FIG. 11, the inference rule 1 includes the primitive expressions Smoke (x) and Cancer (x), and both the expressions are connected by a logical connector⇒representing implication. The inference rule 2 includes the primitive expressions Friend (x, y), Smoke (x) and Smoke (y), Smoke (x) and Smoke (y) are connected by a logical connector⇔, and the result of the connection and Friend (x, y) are connected by a logical connector⇒. Assuming two persons A and B substituted into x and y, and assuming that a primitive expression is a node and a connection is a link, a network as shown in FIG. 11 is generated.

It is assumed that Cancer is a query, the hop count of the query is 1, and the reciprocal of the hop count up to the nearest Cancer is the importance level of a primitive expression. Referring to FIG. 11, the minimum value of a hop count from Smoke to the query is 2, and the minimum value of a hop count from Friend to the query is 3. Therefore, the importance level of Smoke (x) is "1/2," the importance level of Cancer (x) is "1/1," and the importance level of Friend (x, y) is "1/3."

Figure 12:
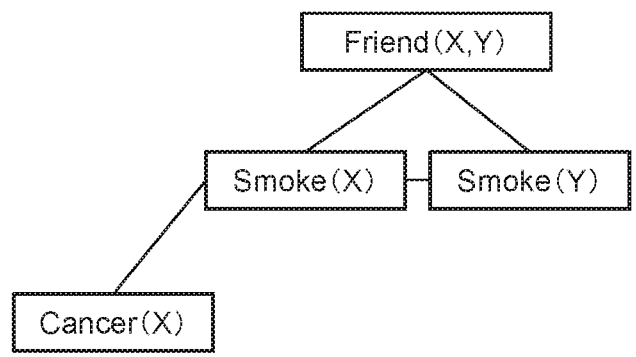
FIG. 12 is a diagram showing another example of a network at the time of calculation of an importance level for each primitive expression type by using a hop count up to a primitive expression that becomes a query in the inference system according to the first example embodiment of the present invention.

Although ae network is generated assuming two persons A and B in FIG. 11, a network as shown in FIG. 12 may be generated without making such an assumption. In the network shown in FIG. 12, a hop count from Smoke (x) to the query is 2, and a hop count from Friend (x, y) to the query is 3. A hop count from Smoke (y) to the query is 3, but since Smoke (y) is the same type of primitive expression as Smoke (x), the smaller hop count "2" from Smoke (x) to the query is employed. Assuming the importance level of a primitive expression is the reciprocal of a hop count, the result is the same as in FIG. 11; the importance level of Smoke (x) is "1/2," the importance level of Cancer (x) is "1/1," and the importance level of Friend (x, y) is "1/3."

Other Method

Although the method of using the weight of a rule and the method of using a hop count up to a primitive expression that becomes a query have been described above as a method for calculating an importance level for each primitive expression type, an importance level for each primitive expression type may be calculated by using another rule structure. As another rule structure, a method of using the number of outgoing links of a primitive expression that is each node in the networks shown in FIGS. 11 and 12 can be considered. Moreover, an importance level for each primitive expression type may be calculated by combining the number of outgoing links with the weight of a rule or a hop count up to a primitive expression that becomes a query as mentioned above. Here, the weight of a rule, a hop count to a primitive expression that becomes a query, and the number of outgoing links of a primitive expression can be referred to as the structure parameter of a rule.

Next, a method in which the fact data generation part 123 generates a set of the fact data 136 from a set of the input data 132 will be described in detail.

It is assumed that the fact data totality 134 is 120. It is also assumed that there are three types of primitive expressions of Smoke (x), Cancer (x), and Friend (x, y), and the importance levels 135 of the primitive expressions are "6," "5," and "1." In this case, the fact data generation part 123 calculates a fact data count for each primitive expression type by the following expressions:

fact data count of primitive expression Smoke
$(x)=120\times(6/(6+5+1))=60$ fact data count of primitive expression Cancer
$(x)=120\times(5/(6+5+1))=50$ fact data count of primitive expression Friend $(x,y)$
$=120\times(1/(6+5+1))=60$.

Figure 13:
FIG. 13 is a diagram showing an example of extraction of fact data from input data in the inference system according to the first example embodiment of the present invention.
Figure 13:
Figure 13:

Next, as shown in FIG. 13, the fact data generation part 123 randomly samples 60 pieces of input data from input data classified in the primitive expression Smoke of FIG. 3 stored in the input data storage area 112, and stores the randomly sampled input data into the fact data storage area 115. Moreover, as shown in FIG. 13, the fact data generation part 123 randomly samples 50 pieces of input data from input data classified in the primitive expression Cancer of FIG. 3 stored in the input data storage area 112, and stores the randomly sampled input data into the fact data storage area 115. Moreover, as shown in FIG. 13, the fact data generation part 123 randomly samples 10 pieces of input data from input data classified in the primitive expression Friend of FIG. 3 stored in the input data storage area 112, and stores the randomly stored input data into the fact data storage area 115.

Thus, according to this example embodiment, it is possible to prevent the accuracy of inference from largely decreasing even when the amount of fact data is reduced in order to reduce the amount of calculation. The reason is that the importance level calculation part 122 and the fact data generation part 123 are included, the importance level calculation part 122 calculates an importance level for each type of facts defined in the rules 131 based on the structures of the rules 131, and the fact data generation part 123 generates, for each type of facts, the fact data 136 in which true/false is observed as a fact by a number corresponding to the importance level of the type of the facts, from a set of the input data 132.

Further, according to this example embodiment, the amount of fact data is reduced, so that it is possible to reduce the size of memory in a computer for storing fact data. Moreover, according to this example embodiment, the amount of fact data is reduced, so that it is possible to reduce the amount of calculation and the time for calculation in a computer necessary for inference. Moreover, according to this example embodiment, it is possible to reduce the size of memory, the amount of calculation, and the time for calculation in a computer as described above, so that it is possible to reduce the power consumption of the computer.

Second Example Embodiment

Figure 14:
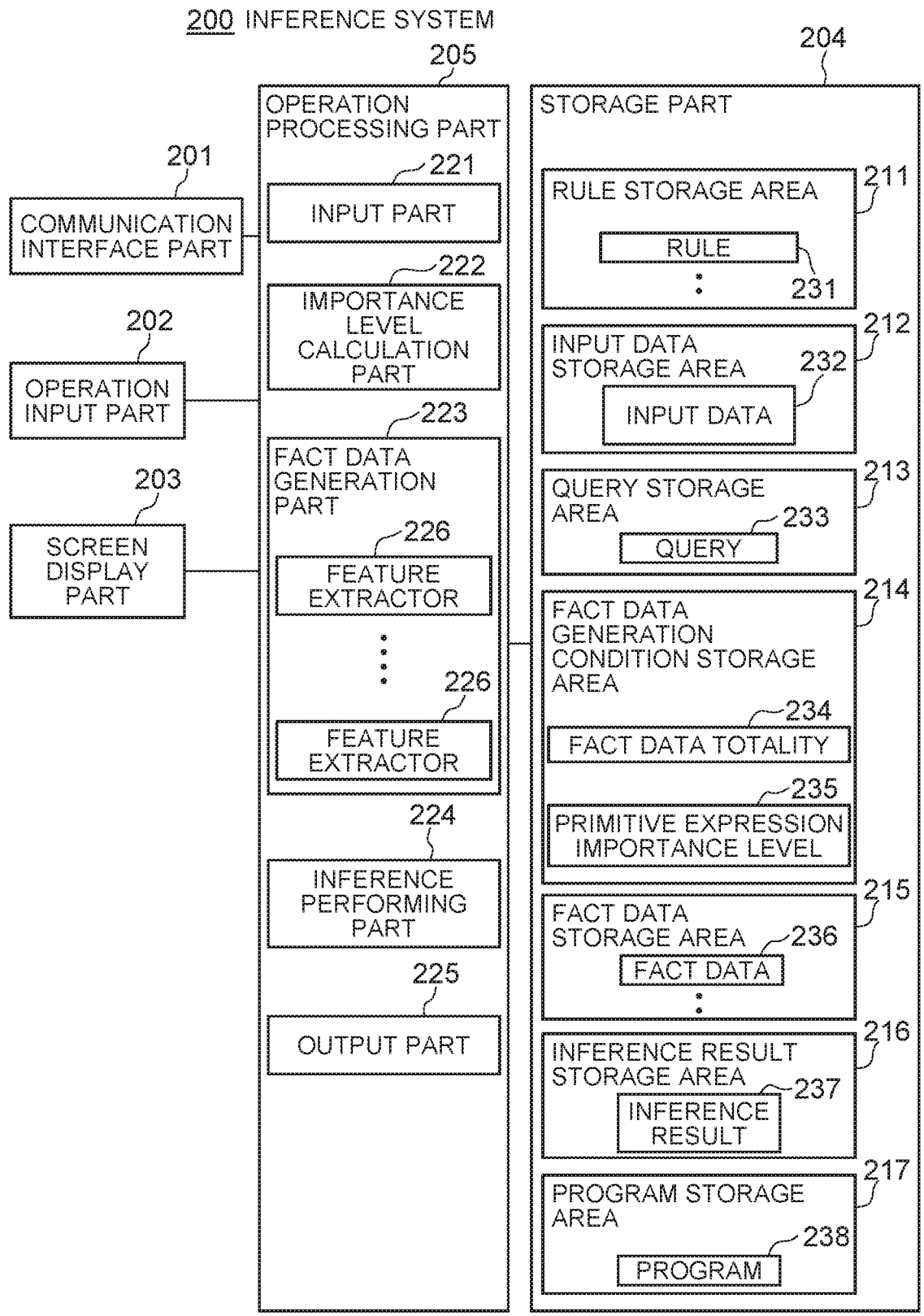
FIG. 14 is a block diagram of an inference system according to a second example embodiment of the present invention.

FIG. 14 is a block diagram of an inference system 200 according to a second example embodiment of the present invention. The inference system 200 according to this example embodiment includes, as major hardware, a communication interface part 201, an operation input part 202, a screen display part 203, a storage part 204, and an operation processing part 205. Among them, the communication interface part 201, the operation input part 202, and the screen display part 203 are the same as the communication interface part 101, the operation input part 102, and the screen display part 103 in the first example embodiment shown in FIG. 1.

The storage part 204 is formed by a storage device such as a hard disk and a memory. The storage part 204 has a storage area for storing processing information necessary for various processing executed by the operation processing part 205 and a program. To be specific, the storage part 204 includes a rule storage area 211, an input data storage area 212, a query storage area 213, a fact data generation condition storage area 214, a fact data storage area 215, an inference result storage area 216, and a program storage area 217. Among them, the rule storage area 211, the query storage area 213, the fact data generation condition storage area 214, the fact data storage area 215, and the inference result storage area 216 are the same as the rule storage area 111, the query storage area 113, the fact data generation condition storage area 114, the fact data storage area 115, and the inference result storage area 116 of the first example embodiment shown in FIG. 1. Moreover, a rule 231 stored in the rule storage area 211, a query 233 stored in the query storage area 213, a fact data totality 234 and a primitive expression importance level 235 that are stored in the fact data generation condition storage area 214, and an inference result 237 stored in the inference result storage area 216 are the same as the rule 131 stored in the rule storage area 111, the query 133 stored in the query storage area 113, the fact data totality 134 and the primitive expression importance level 135 that are stored in the fact data generation condition storage area 114, and the inference result 237 stored in the inference result storage area 116.

In the input data storage area 212, input data 232 is stored. The input data 232 includes unstructured data such as text data and image data. The input data 232 may include structured data such as relational data. In this example embodiment, fact data expressed in the form of first-order predicate logic is extracted from the input data 232 including unstructured data such as text data. Such input data 232 may also be referred to as raw data.

FIG. 15 shows an example of the input data 232. The input data 232 in this example is text data. The input data 232 includes items such as "Mr. A is known as a smoker" and "Mr. A often goes for a walk with his friend B."

In the program storage area 217, a program 238 is stored. The program 238 is a program loaded and executed by the operation processing part 205 to realize various processing parts. The program 238 is previously loaded from an external device (not shown) via a data input/output function such as the communication interface part 201 or from a program storage medium such as a CD-ROM, and stored into the program storage area 217.

The operation processing part 205 has a microprocessor such as an MPU and a peripheral circuit thereof, and has a function of, by loading the program 238 from the storage part 204 and executing the program 238, causing the above-mentioned hardware and the program 238 to cooperate and realizing various processing parts. Major processing parts realized by the operation processing part 205 are an input part 221, an importance level calculation part 222, a fact data generation part 223, an inference performing part 224, and an output part 225. Among them, the input part 221, the importance level calculation part 222, the inference performing part 224, and the output part 225 are the same as the input part 121, the importance level calculation part 122, the inference performing part 124, and the output part 125 in the first example embodiment shown in FIG. 1.

The fact data generation part 223 has a function of generating fact data 236 from the input data 232. To be specific, the fact data generation part 223 retrieves the input data 232 from the input data storage area 212, and retrieves a fact data totality 234 and a primitive expression importance level 235 from fact data generation condition storage area 214. Next, the fact data generation part 223 determines, of the fact data totality 234, a fact data count to be assigned to each type of the primitive expressions, based on the importance level 235 of each of the primitive expressions. At this time, a larger fact data count is assigned to a primitive expression type having a higher importance level than a primitive expression type having a lower importance level. Next, the fact data generation part 223 uses a feature extractor 226 to extract, for each primitive expression type, fact data of the fact data count assigned to the primitive expression type from the input data 232. The fact data generation part 223 stores the fact data extracted and obtained above as fact data 236 into the fact data storage area 215.

The feature extractor 226 has a one-to-one correspondence with a primitive expression type. For example, one feature extractor 226 corresponds to the primitive expression Smoke (x). Another feature extractor 226 corresponds to the primitive expression Cancer (x). Yet another feature extractor 226 corresponds to the primitive expression Friend (x, y). The fact data generation part 223 divides the input data 231 into data of predetermined data size. A piece of data obtained by dividing is called a chunk. The predetermined data size may be fixed, or may be designated from outside as one of the fact data generation conditions. The fact data generation part 223 randomly takes one chunk from a set of chunks composing the input data 231 and inputs the chunk into each of the feature extractors 226. Each of the feature extractors 226 analyzes the input chunk and, if a fact corresponding to a primitive expression corresponding to the feature extractor 226 is included in the chunk, the feature extractor 226 extracts the fact and outputs the fact in the form of a first-order predicate logic. The fact data generation part 223 counts the number of fact data output from each of the feature extractors 226 and stops the operation of the feature extractor 226 having output fact data of the number assigned to each primitive expression type. Moreover, the fact data generation part 223 stores the fact data output from the feature extractor 226 as the fact data 236 into the fact data storage area 215. As the feature extractor 226, for example, the feature extractor described in Non-Patent Document 1 can be used.

Figure 16:
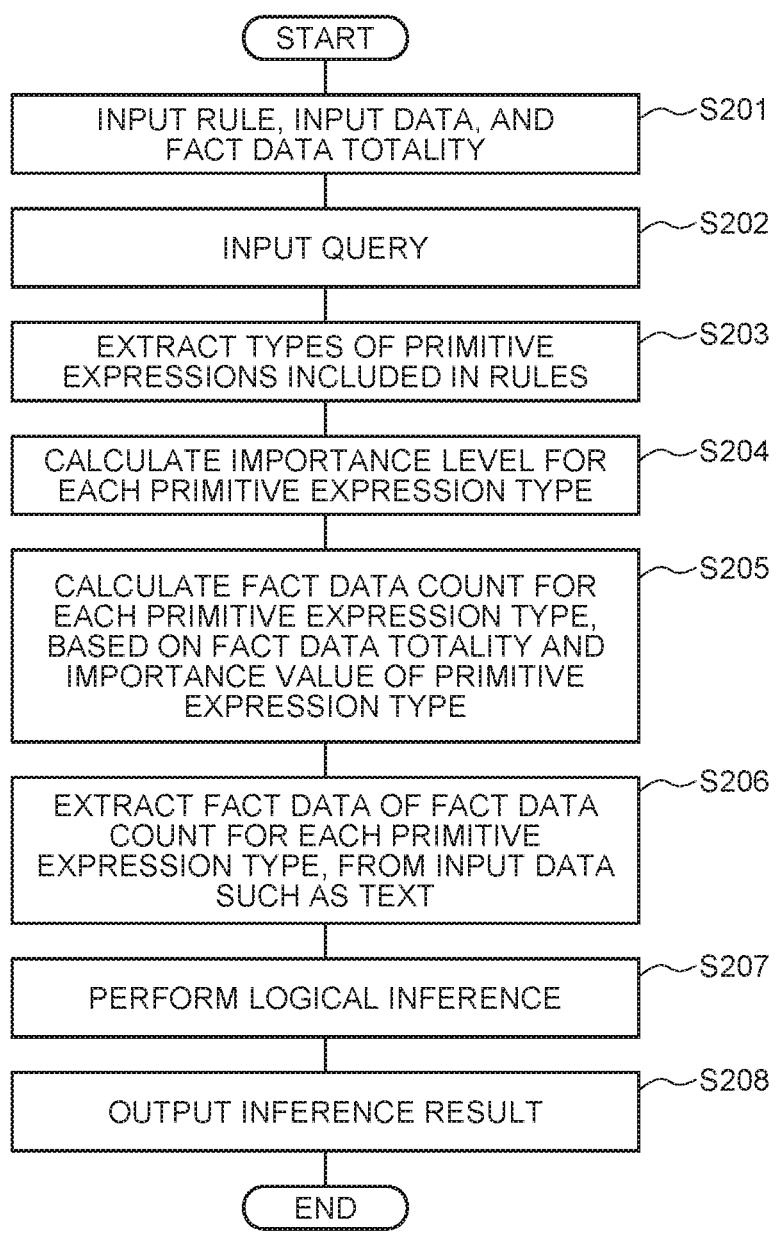
FIG. 16 is a flowchart showing an example of the operation of the inference system according to the second example embodiment of the present invention.

FIG. 16 is a flowchart showing an example of the operation of the inference system 200 according to this example embodiment. Of steps S201 to S208 shown in FIG. 16, steps S201 to S205, S207 to S208 are the same as the operation at steps S101 to S105, S107 to S108 of the inference system 100 according to the first example embodiment shown in FIG. 8.

At step S206 of FIG. 16, the fact data generation part 223 retrieves the input data 232 from the input data storage area 212 of the storage part 204, extracts fact data by a fact data count assigned to each primitive expression type from the input data 232 by using the feature extractor 226 of the primitive expression type, and stores the fact data as the fact data 236 into the fact data storage area 215.

Next, a method in which the fact data generation part 223 generates the fact data 236 from the input data 232 will be described in detail.

It is assumed that the fact data totality 234 is 120. It is also assumed that there are three types of primitive expressions including Smoke (x), Cancer (x), and Friend (x, y), and the importance levels 235 of the expressions are "6," "5," and "1." In this case, the fact data generation part 223 performs calculation, assuming that the fact data count of the primitive expression Smoke (x) is 60, the fact data count of the primitive expression Cancer (x) is 50, and the fact data count of the primitive expression Friend (x, y) is 10.

Figure 17:
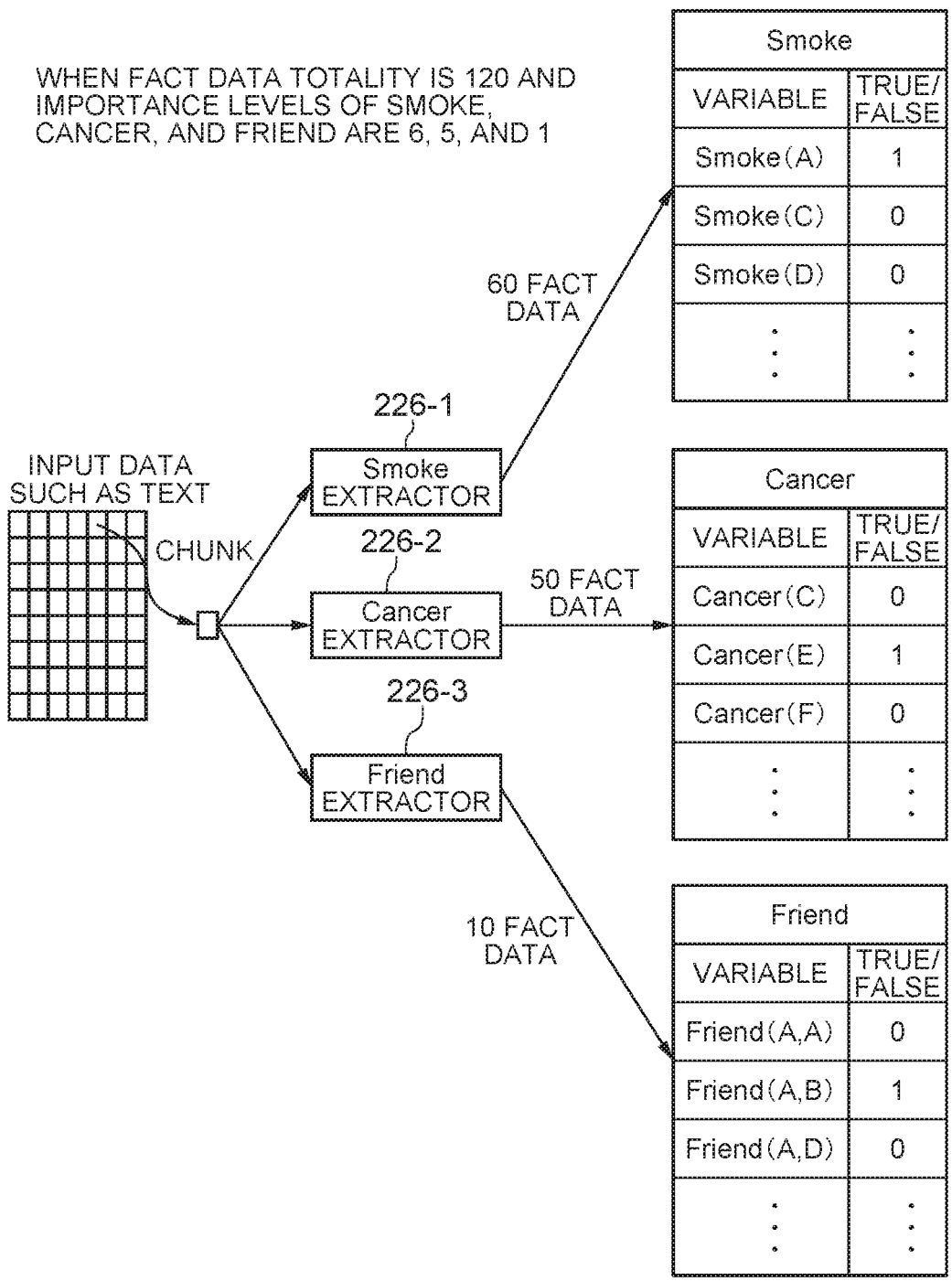
FIG. 17 is a diagram showing an example of extraction of fact data from input data in the inference system according to the second example embodiment of the present invention.

Next, as shown in FIG. 17, the fact data generation part 223 inputs a chunk randomly extracted from the input data 232 into the feature extractor 226-1 corresponding to the primitive expression Smoke (x), the feature extractor 226-2 corresponding to the primitive expression Cancer (x), and the feature extractor 226-3 corresponding to the primitive expression Friend (x, y). The feature extractor 226-1 analyzes the input chunk and, if there is a fact corresponding to the primitive expression Smoke (x), extracts the fact and outputs the fact in a predetermined format. The feature extractor 226-2 analyzes the input chunk and, if there is a fact corresponding to the primitive expression Cancer (x), extracts the fact and outputs the fact in a predetermined format. The feature extractor 226-3 analyzes the input chunk and, if there is a fact corresponding to the primitive expression Friend (x, y), extracts the fact and outputs the fact in a predetermined format.

The fact data generation part 223 monitors whether or not fact data is output from the feature extractors 226-1 to 226-3. When the fact data is output from the feature extractors 226-1 to 226-3, the fact data generation part 223 stores the output fact data into the fact data storage area 215. The fact data generation part 223 also counts the number of generated fact data for each of the feature extractors 226-1 to 226-3.

When finishing processing one chunk, the fact data generation part 223 repeats the same operation as described above on a subsequent one chunk randomly extracted. Then, when 60 fact data are output in total from the feature extractor 226-1, the fact data generation part 223 stops the operation of the feature extractor 226-1. Also, when 50 fact data are output in total from the feature extractor 226-2, the fact data generation part 223 stops the operation of the feature extractor 226-2. Also, when 10 fact data are output in total from the feature extractor 226-3, the fact data generation part 223 stops the operation of the feature extractor 226-3.

Thus, according to this example embodiment, it is possible to prevent the accuracy of inference from largely decreasing even if reducing the amount of fact data in order to reduce the amount of calculation. The reason is that the importance level calculation part 222 and the fact data generation part 223 are included, the importance level calculation part 222 calculates an importance level for each fact type defined in the rule 131 based on the structure of the rule 131, and the fact data generation part 223 generates, for each fact type, the fact data 236 in which true/false is observed as a fact by a number corresponding to the importance level of the fact type, from the input data 132 including unstructured data such as text.

Further, it is possible to reduce the number of fact data extracted in a format of fact data used in logical inference from the input data 232 including unstructured data such as text, so that it is possible to reduce the time for calculation required to extract fact data from raw data accordingly.

Third Example Embodiment

Next, a third example embodiment of the present invention will be described.

Figure 18:
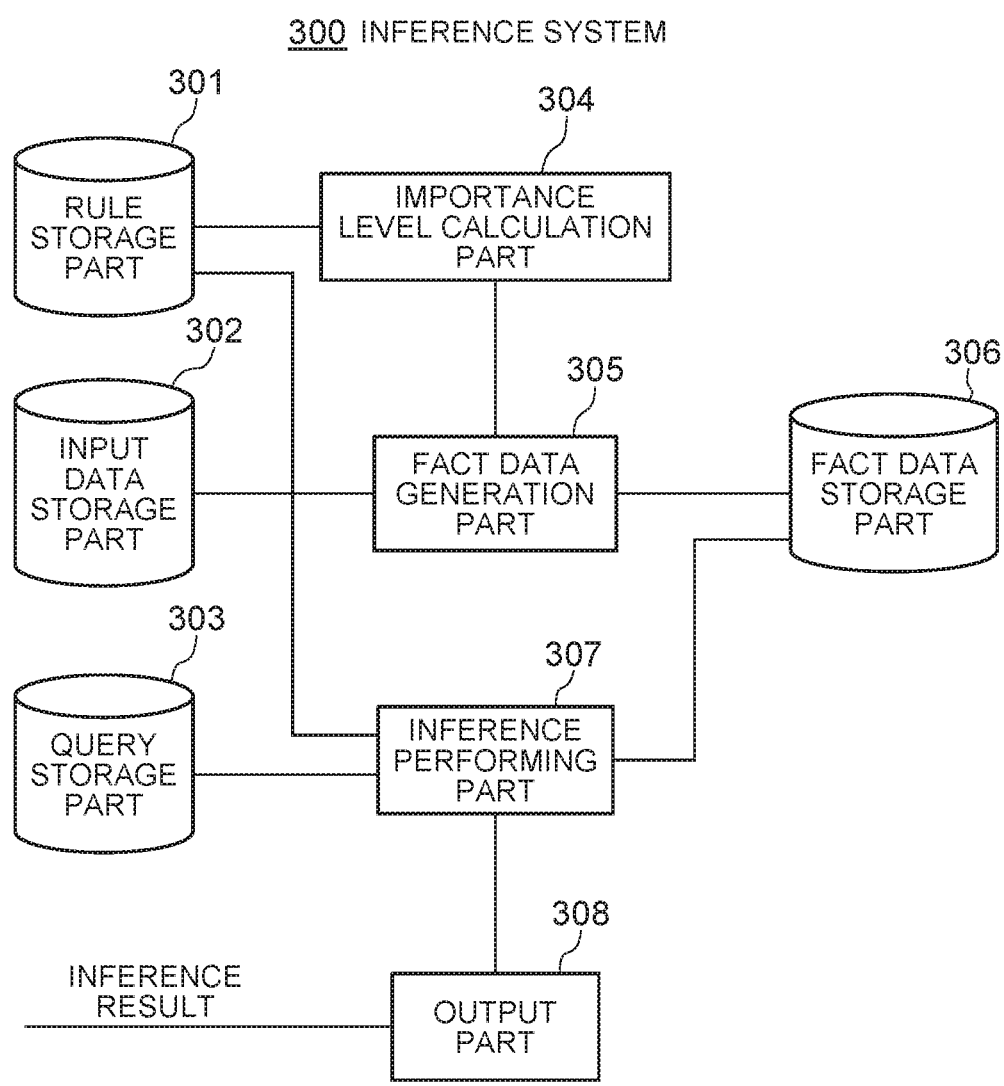
FIG. 18 is a block diagram of an inference system according to a third example embodiment of the present invention.

FIG. 18 is a block diagram of an inference system according to a third example embodiment of the present invention. Referring to FIG. 18, the inference system 300 according to this example embodiment includes a rule storage part 301, an input data storage part 302, a query storage part 303, an importance level calculation part 304, a fact data generation part 305, a fact data storage part 306, an inference performing part 307, and an output part 308.

In the rule storage part 301, a set of rules each defining facts and the relation between the facts, and a weight representing the importance level of the rule are stored. In the input data storage part 302, input data is stored. In the query storage part 303, a query is stored. The importance level calculation part 304 calculates the importance level for each type of the facts defined by the rule, based on the structure of the rule. The fact data generation part 305 generates, for each fact type, fact data in which true/false is observed as a fact, by a number corresponding to the importance level of the fact type. In the fact data storage part, fact data is stored. The inference performing part 307 probabilistically infers the result of a query by using the fact data, the rules, and the weights. The output part 308 outputs the result of the inference. The importance level calculation part 304, the inference performing part 307, and the output part 308 that are described above can be realized in the same manner as the importance level calculation part 122, the inference performing part 124, and the output part 125 that are shown in FIG. 1. Moreover, the above fact data generation part can be realized in the same manner as the fact data generation part 123 of FIG. 1 or the fact data generation part 223 of FIG. 14.

The inference system according to this example embodiment thus configured operates in the following manner. That is to say, the importance level calculation part 304, based on the structure of the rules stored in the rule storage part 301, calculates the importance level for each type of the facts defined by the rules. Next, the fact data generation part 305 generates, for each fact type, fact data in which true/false is observed as the fact by a number corresponding to the importance level of the fact type calculated by the importance level calculation part 304, from the input data stored in the input data storage part 302, and stores the fact data into the fact data storage part 306. Next, the inference performing part 307 probabilistically infers the result of the query stored in the query storage part by using the fact data stored in the fact data storage part 306 and the rules and weights stored in the rule storage part 301. Next, the output part 308 outputs the result of inference by the inference performing part 307.

Thus, according to this example embodiment, it is possible to prevent the accuracy of inference from largely decreasing even if reducing the amount of fact data in order to reduce the amount of calculation. The reason is that an importance level for each type of facts defined in rules used for inference is calculated based on the structure of the rules used for inference and, from a set of input data, for each fact type, fact data in which true/false is observed as a fact is generated by a number corresponding to the importance level of the fact type.

Although the present invention has been described above with reference to the example embodiments, the present invention is not restricted to the example embodiments. The configurations and details of the present invention can be changed in various manners that can be understood by one skilled in the art within the scope of the present invention.

The present invention is based upon and claims the benefit of priority from Japanese patent application No. 2017-094948, filed on May 11, 2017, the disclosure of which is incorporated herein in its entirety by reference.

INDUSTRIAL APPLICABILITY

The present invention can be applied to an inference system that infers a fact which is not explicitly shown as knowledge by using a rule describing facts and the relation between the facts, more specifically, a probabilistic inference system.

DESCRIPTION OF NUMERALS 100 inference system
101 communication interface part
102 operation input part
103 screen display part
104 storage part
105 operation processing part
111 rule storage area
112 input data storage area
113 query storage area
114 fact data generation condition storage area
115 fact data storage area
116 inference result storage area
117 program storage area
121 input part
122 importance level calculation part
123 fact data generation part
124 inference performing part
125 output part
126 sampler
131 rule
132 input data
133 query
134 fact data totality
135 primitive expression importance level
136 fact data
137 inference result
138 program
200 inference system
201 communication interface part
202 operation input part
203 screen display part
204 storage part
205 operation processing part
211 rule storage area
212 input data storage area
213 query storage area
214 fact data generation condition storage area
215 fact data storage area
216 inference result storage area
217 program storage area
221 input part
222 importance level calculation part
223 fact data generation part
224 inference performing part
225 output part
226 feature extractor
226-1 Smoke extractor
226-2 Cancer extractor
226-3 Friend extractor
231 rule
232 input data
233 query
234 fact data totality
235 primitive expression importance level
236 fact data
237 inference result
238 program
300 inference system
301 rule storage part
302 input data storage part
303 query storage part
304 importance level calculation part
305 fact data generation part
306 fact data storage part
307 inference performing part
308 output part

The invention claimed is:

1. An inference system comprising a memory storing a set of rules, input data, a query, and a program instruction, and comprising a processor connected to the memory, each rule of the set of rules being expressed in a form of first-order predicate logic, and including a primitive expression representing a fact, a logical connector representing a relation between the primitive expressions, and a weight representing an importance level of the rule, the input data including a plurality of units of fact data expressed in the form of first-order predicate logic, each unit of the plurality of units of fact data including a primitive expression representing a fact relating to a specific individual and a value representing whether the primitive expression is true or false, the query being a set of primitive expressions for each of which a probability of being true is desired to be known, wherein the processor is programmed to execute the program instruction for:

calculating an importance level of the primitive expression for each type of the primitive expressions included in the set of rules;

generating, for each type of the primitive expressions included in the set of rules, fact data including a primitive expression of the type by a number corresponding to the importance level of the primitive expression of the type, from the input data;

performing probabilistic inference of a result of the query by using the generated fact data and the set of rules; and outputting a result of the probabilistic inference.

2. The inference system according to claim 1, wherein the processor is programmed to, in the generating the fact data, for each type of the primitive expressions, sample the fact data by the number corresponding to the importance level of the type of the primitive expression, from the input data.

3. The inference system according to claim 1, wherein:
the input data further includes unstructured data; and
the processor is programmed to, in the generating the fact data, for each type of the primitive expressions, extract the fact data by the number corresponding to the importance level of the type of the primitive expression, from the unstructured data.

4. The inference system according to claim 1, wherein the processor is programmed to, in the calculating the importance level, calculate an importance level of each type of the primitive expressions based on the weights of the set of rules.

5. The inference system according to claim 1, wherein the processor is programmed to, in the calculating the importance level, calculate an importance level of each type of the primitive expressions based on a minimum number of links from a type of the primitive expression to a type of the primitive expression included in the query in a network in which types of the primitive expressions related by the set of rules are connected by links.

6. The inference system according to claim 1, wherein the processor is programmed to, in the generating the fact data, stop generating the fact data when a totality of the fact data of each type of the primitive expressions reaches a preset value.

7. An inference method performed by an information processing device that has a memory storing a set of rules, input data, and a query, and has a processor connected to the memory,
each rule of the set of rules being expressed in a form of first-order predicate logic, and including a primitive expression representing a fact, a logical connector representing a relation between the primitive expressions, and a weight representing an importance level of the rule,
the input data including a plurality of units of fact data expressed in the form of first-order predicate logic, each unit of the plurality of units of fact data including a primitive expression representing a fact relating to a specific individual and a value representing whether the primitive expression is true or false,
the query being a set of primitive expressions for each of which a probability of being true is desired to be known,
the inference method comprising:
calculating an importance level of the primitive expression for each type of the primitive expressions included in the set of rules;
generating, for each type of the primitive expressions included in the set of rules, fact data including a primitive expression of the type by a number corresponding to the importance level of the primitive expression of the type, from the input data;
performing probabilistic inference of a result of the query by using the generated fact data and the set of rules; and
outputting a result of the probabilistic inference.

8. The inference method according to claim 7, wherein in the generating the fact data, for each type of the primitive expressions, sampling the fact data by the number corresponding to the importance level of the type of the primitive expression from the input data is performed.

9. The inference method according to claim 7, wherein:
the input data further includes unstructured data; and
in the generating the fact data, for each type of the primitive expressions, extracting the fact data by the number corresponding to the importance level of the type of the primitive expression from the unstructured data is performed.

10. The inference method according to claim 7, wherein, in the calculating the importance level, an importance level of each type of the primitive expressions is calculated based on the weights of the set of rules.

11. The inference method according to claim 7, wherein, in the calculating the importance level, an importance level of each type of the primitive expressions is calculated based on a minimum number of links from a type of the primitive expression to a type of the primitive expression included in the query in a network in which types of the primitive expressions related by the set of rules are connected by links.

12. The inference method according to claim 7, wherein, in the generating the fact data, the generating is stopped when a totality of the fact data of each type of the primitive expressions reaches a preset value.

13. A non-transitory computer-readable recording medium storing a program comprising instructions for causing a processor, which is connected to a memory storing a set of rules, input data, and a query,
each rule of the set of rules being expressed in a form of first-order predicate logic, and including a primitive expression representing a fact, a logical connector representing a relation between the primitive expressions, and a weight representing an importance level of the rule,
the input data including a plurality of units of fact data expressed in the form of first-order predicate logic, each unit of the plurality of units of fact data including a primitive expression representing a fact relating to a specific individual and a value representing whether the primitive expression is true or false,
the query being a set of primitive expressions for each of which a probability of being true is desired to be known,
to execute:
a process to calculate an importance level of the primitive expression for each type of the primitive expressions included in the set of rules;
a process to generate, for each type of the primitive expressions included in the set of rules, fact data including a primitive expression of the type by a number corresponding to the importance level of the primitive expression of the type, from the input data;
a process to perform probabilistic inference of a result of the query by using the generated fact data and the set of rules; and
a process to output a result of the probabilistic inference.

14. The inference system according to claim 3, wherein in the extracting the fact data, the processor divides the unstructured data into a plurality of chunks, and repeats processing to extract a fact corresponding to the primitive expression from a chunk randomly taken from the plurality of chunks and output the fact in the form of first-order predicate logic by a number of times corresponding to a number of units of fact data corresponding to the primitive expression.

15. The inference method according to claim 9, wherein, in the extracting the fact data, the unstructured data is divided into a plurality of chunks, and processing to extract a fact corresponding to the primitive expression from a chunk randomly taken from the plurality of chunks and output the fact in the form of first-order predicate logic is repeated by a number of times corresponding to a number of units of fact data corresponding to the primitive expression.

* * * * *